United States Patent
Jin (10) Patent No.: US 9,335,587 B2
(45) Date of Patent: May 10, 2016

(54) LIQUID CRYSTAL CELL AND METHOD FOR MANUFACTURING THE SAME

(71) Applicants: Shanghai Tianma Micro-Electronics Co., Ltd., Shanghai (CN); Tianma Micro-Electronics Co., Ltd., Shenzhen (CN)

(72) Inventor: Minhong Jin, Shanghai (CN)

(73) Assignees: Shanghai Tianma Micro-Electronics Co., Ltd., Shanghai, P.R. (CN); Tianma Micro-Electronics Co., Ltd., Shenzhen, P.R. (CN)

( * ) Notice: Subject to any disclaimer, the term of this patent is extended or adjusted under 35 U.S.C. 154(b) by 0 days.

(21) Appl. No.: 14/091,141

(22) Filed: Nov. 26, 2013

(65) Prior Publication Data
US 2015/0002793 A1    Jan. 1, 2015

(30) Foreign Application Priority Data

Jun. 28, 2013  (CN) .......................... 2013 1 0271047

(51) Int. Cl.
*G02F 1/1333*  (2006.01)
*G02F 1/1339*  (2006.01)

(52) U.S. Cl.
CPC .......... *G02F 1/13392* (2013.01); *G02F 1/1333* (2013.01); *G02F 1/13394* (2013.01); *G02F 2001/13396* (2013.01); *G02F 2001/13398* (2013.01); *G02F 2201/503* (2013.01)

(58) Field of Classification Search
CPC .................................................. G02F 1/13394
USPC ....................................................... 349/157
See application file for complete search history.

(56) References Cited

U.S. PATENT DOCUMENTS

| | | | |
|---|---|---|---|
| 7,557,895 B2 | 7/2009 | Sawasaki et al. | |
| 2008/0182351 A1 | 7/2008 | Sawasaki et al. | |
| 2009/0180043 A1 | 7/2009 | Rho et al. | |
| 2010/0007843 A1 | 1/2010 | Shen | |
| 2010/0079694 A1* | 4/2010 | Yoshida et al. | 349/40 |
| 2011/0007251 A1* | 1/2011 | Yamamoto et al. | 349/108 |
| 2012/0008080 A1 | 1/2012 | Daishi | |

FOREIGN PATENT DOCUMENTS

CN           1661426 A       8/2005

OTHER PUBLICATIONS

Extended European Search Report for European Application No. 13194207, mailed Nov. 3, 2014, 10 pages total.

* cited by examiner

*Primary Examiner* — Wen-Ying P Chen
(74) *Attorney, Agent, or Firm* — Alston & Bird LLP (57) ABSTRACT

A liquid crystal cell is disclosed. The cell includes a first substrate, and a first overcoat layer. The first substrate includes first and second regions. The cell also includes a barrier layer on the first overcoat layer in the first region, a second substrate bonded with the first substrate, and a first spacer on the second substrate, where the first spacer is aligned with the first region. The cell also includes a second spacer on the second substrate facing the first substrate, where the second spacer aligns with the second region, and the length of the first spacer is greater than or equal to the length of the second spacer. The cell also includes a liquid crystal layer between the first and second substrates, where the area of a lower surface of the barrier layer is greater than the area of a lower surface of the first spacer.

12 Claims, 5 Drawing Sheets

LIQUID CRYSTAL CELL AND METHOD FOR MANUFACTURING THE SAME

CROSS-REFERENCES TO RELATED APPLICATIONS

The present application claims the benefit of priority to Chinese Patent Application No. 201310271047.7, entitled as "Liquid crystal cell and method for manufacturing the same", filed with the Chinese Patent Office on Jun. 28, 2013, the content of which is incorporated herein by reference in its entirety.

FIELD OF THE INVENTION

The invention relates to a display device and a method for manufacturing the display device, and in particular to a liquid crystal cell and a method for manufacturing the same.

BACKGROUND OF THE INVENTION

Due to the increasing need, various flat panel display devices have been developed. For example, the flat panel display devices may be Liquid Crystal Display devices (LCD), Plasma Display Panel (PDP) devices, Electro Luminescence Display (ELD) devices, and Vacuum Fluorescent Display (VFD) devices. Among these flat panel display devices, usually the LCD device is used since it has thinner shape, lighter weight and lower energy consumption. For example, the LCD device is usually used as a substitution for a Cathode Ray Tube (CRT). In addition, the LCD device is usually used in a notebook computer, a computer display and a television. However, in order to use the LCD device in a common display device, the LCD device has to generate an image with high quality, such as a high resolution, a high brightness and a large screen size, while maintaining its lighter weight, thinner shape and lower energy consumption.

Figure 1:
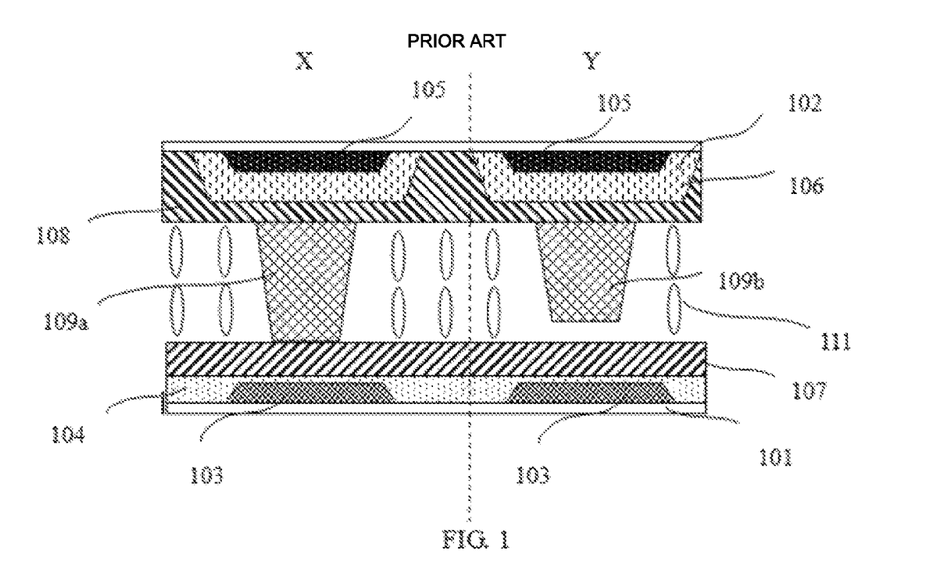
FIG. 1 is a cross-sectional view of a liquid crystal cell in the prior art.

FIG. 1 is a cross-sectional view of a liquid crystal cell in the prior art. The liquid crystal cell includes a first substrate 101 and a gate electrode 103 formed on the first substrate 101 and having the shape shown in FIG. 1; and a passivation layer 104 and a first overcoat layer 107 are sequentially formed on the surface of the gate electrode 103. In addition, the liquid crystal cell further includes a second substrate 102 bonded with the first substrate 101, and a black matrix layer 105 and a color filter layer 106 having the shapes shown in FIG. 1 are sequentially formed on the surface of the second substrate 102, and a second overcoat layer 108 is formed on the surface of the color filter layer 106. As shown in FIG. 1, the LCD device is divided into a first region X and a second region Y along a vertical axis. A first spacer 109a is formed on the surface of the second overcoat layer 108 in the first region X, and a second spacer 109b is formed on the surface of the second overcoat layer 108 in the second region Y. The length of the first spacer 109a is greater than the length of the second spacer 109b, and the area of a lower surface of the first spacer 109a is less than the area of an upper surface of the first spacer 109a and the area of a lower surface of the second spacer 109b is less than the area of an upper surface of the second spacer 109b. Furthermore, a liquid crystal layer 111 is formed between the first substrate 101 and the second substrate 102.

Figure 2:
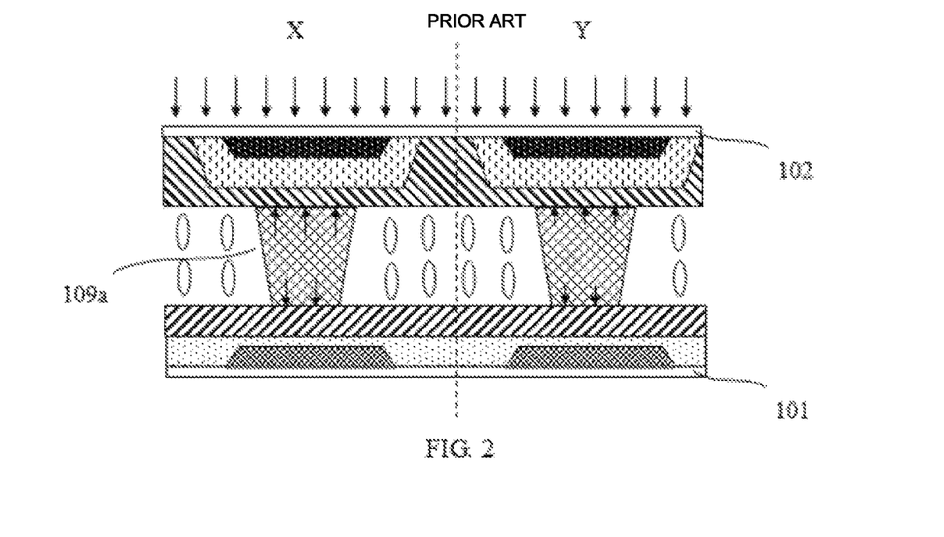
FIG. 2 is a schematic diagram of the liquid crystal cell structure shown in FIG. 1 in the case of suffering an appropriate external pressure.

As shown in FIG. 2, when a normal pressure (i.e., 300-400 N) is applied to the second substrate 102, the height of a space between the first substrate 101 and the second substrate 102 is reduced, and the length of the first spacer 109a is reduced.

When the pressure is removed, the liquid crystal cell can recover to the state shown in FIG. 1 since the first spacer 109a is made of an elastic material.

Figure 3:
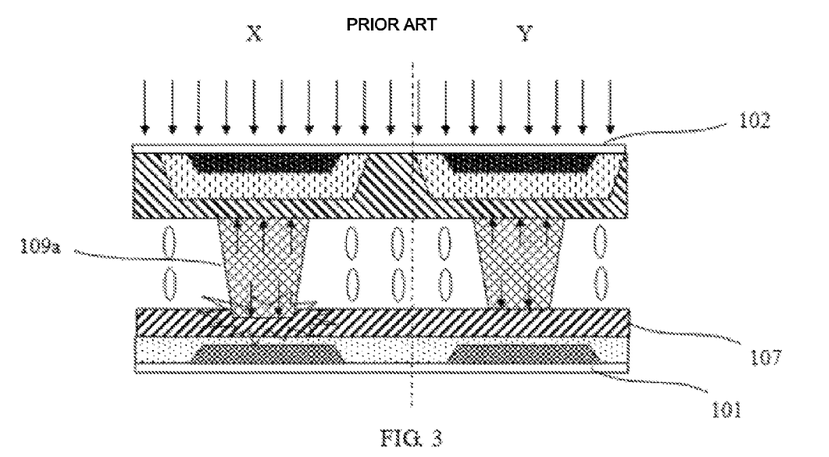
FIG. 3 is a schematic diagram of the liquid crystal cell structure shown in FIG. 1 in the case of suffering a greater external pressure.
Figure 4:
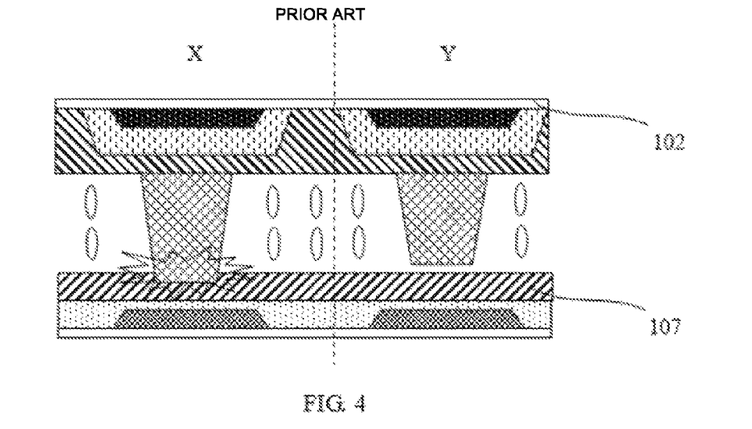
FIG. 4 is a schematic diagram of the liquid crystal cell structure shown in FIG. 3 after the pressure is removed.

As shown in FIG. 3, when a greater pressure (i.e., 900-990 N) is applied to the second substrate 102, the first overcoat layer 107 formed on the first substrate 101 suffers pressure from the first spacer 109a and becomes damaged. Furthermore, as shown in FIG. 4, when the pressure applied to the second substrate 102 is removed, the damaged first overcoat layer 107 can not recover.

Figure 5:
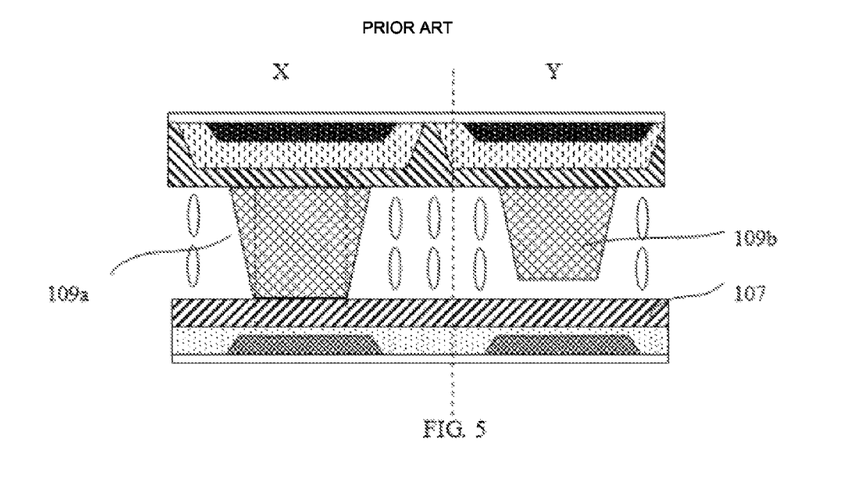
FIG. 5 is a cross-sectional view of another liquid crystal cell in the prior art.

In order to solve the problem that the liquid crystal cell with the structure described above can not withstand a great pressure, those skilled in the art employ a structure shown in FIG. 5, i.e. both the upper surface areas and the lower surface areas of the first spacer 109a and the second spacer 109b are set to be larger to reduce the intensity of pressure suffered by the first overcoat layer 107. However, employing the technical scheme of FIG. 5 reduces the aperture ratio significantly, which is not beneficial to satisfy the requirements of the modern liquid crystal display with a high resolution.

BRIEF SUMMARY OF THE INVENTION

One inventive aspect is a liquid crystal cell. The cell includes a first substrate, and a first overcoat layer being formed on a surface of the first substrate, where the first substrate includes a first region and a second region. The cell also includes a barrier layer being formed on a surface of the first overcoat layer in the first region, a second substrate bonded with the first substrate, and a first spacer being formed on a surface of the second substrate facing the first substrate, where the first spacer is aligned with the first region. The cell also includes a second spacer being formed on the surface of the second substrate facing the first substrate, where the second spacer is aligned with the second region, and where the length of the first spacer is greater than or equal to the length of the second spacer. The cell also includes a liquid crystal layer formed between the first substrate and the second substrate, where the surface area of a lower surface of the barrier layer is greater than the surface area of a lower surface of the first spacer.

Another inventive aspect is a method of manufacturing a liquid crystal cell. The method includes providing a first substrate, forming a first overcoat layer on a surface of the first substrate, the first substrate having a first region and a second region, and forming a barrier layer on the first overcoat layer in the first region. The method also includes providing a second substrate, forming a first spacer on a surface of the second substrate aligned with the first region, and forming a second spacer on a surface of the second substrate aligned with the second region, where the length of the first spacer is greater than or equal to the length of the second spacer. The method also includes bonding the first substrate with the second substrate, and forming a liquid crystal layer between the first substrate and the second substrate.

DETAILED DESCRIPTION OF THE INVENTION

In order to make certain objects, features and advantages of the invention easy to be understood, certain embodiments of the invention are described hereinafter in conjunction with the accompanying drawings.

Specific details are clarified in the following description so that the invention can be understood. However, the invention can be implemented in a number of other ways different from the ways described herein, and those skilled in the art can make similar extensions without violating the concept of the invention. Therefore, the invention is not limited to the specific embodiments disclosed hereinafter.

First Embodiment

Figure 6:
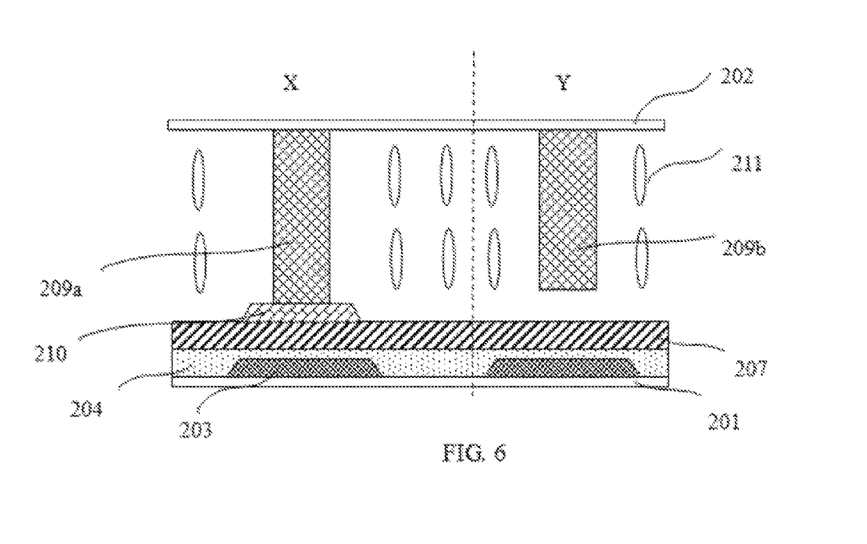
FIG. 6 is a cross-sectional view of a liquid crystal cell according to a first embodiment of the invention.

FIG. 6 is a sectional view of a liquid crystal cell according to a first embodiment of the invention. As shown in FIG. 6, the liquid crystal cell includes: a first substrate 201; and a gate electrode 203 formed on the first substrate 201 and having the shape shown in FIG. 6, and a passivation layer 204 and a first overcoat layer 207 are sequentially formed on the surface of the gate electrode 203. In addition, the liquid crystal cell further includes a second substrate 202 bonded with the first substrate 201. As shown in FIG. 6, the liquid crystal cell is divided into a first region X and a second region Y along a vertical axis. A first spacer 209a is formed on a surface of the second substrate 202 that is close to the first substrate 201 and is in the first region X, and a second spacer 209b is formed on a surface of the second substrate 202 that is close to the first substrate 201 and is in the second region Y. The first spacer 209a and the second spacer 209b abut against the first substrate 201 and the second substrate 202 respectively at their respective upper ends and lower ends, so as to maintain a space between the first substrate 201 and the second substrate 202. The length of the first spacer 209a is greater than the length of the second spacer 209b, the area of a lower surface of the first spacer 209a is equal to the area of an upper surface of the first spacer 209a and the area of a lower surface of the second spacer 209b is equal to the area of an upper surface of the second spacer 209b, and a liquid crystal layer 211 is formed between the first substrate 201 and the second substrate 202.

The first overcoat layer 207 is made of an organic material, and the hardness of the first overcoat layer 207 is much less than the hardness of the second substrate. In order to avoid the case that in the prior art a damaged first overcoat layer can not recover when a greater external force is applied to the second substrate, in the first embodiment, a barrier layer 210 is formed on the surface of the first overcoat layer in the first region X, and the area of a lower surface of the barrier layer 210 is greater than the area of the lower surface of the first spacer 209a. When suffering an external pressure, the pressure suffered by the first overcoat layer 207 is from the barrier layer 210; and since the area of the lower surface of the barrier layer 210 is greater than the area of the lower surface of the first spacer, the intensity of pressure suffered by the first overcoat layer 207 is reduced significantly, thus damage of the first overcoat layer 207 is avoided; and since the second substrate 202 has a higher hardness, the second substrate 202 will not be damaged when suffering the pressure from the first spacer and the second spacer. The material of the barrier layer 210 in the first embodiment is selected as Indium Tin Oxide (ITO), and also it may be selected as other metal materials or nonmetallic materials, and in order not to influence the aperture ratio, preferably, it may be selected as a transparent metal oxide material and so on.

The material of the first substrate 201 and the second substrate 202 may be selected as a material such as glass or resin. The gate electrode 203 formed on the surface of the first substrate 201 is made of a metal material. The passivation layer 204 is made of a material of silicon nitride, for playing a role of insulation and protection for the gate electrode. The first overcoat layer 207 located on the surface of the passivation layer 204 is made of a transparent organic material, for playing a role of planarization. In addition, the material of the first spacer 209a and the second spacer 209b is generally made of an organic material, for playing a role of maintaining the space between the first substrate and the second substrate and preventing them from damage.

According to the invention, the position or the height of the first spacer 209a and the second spacer 209b may vary with the design of the first substrate and the second substrate. Furthermore, as shown in FIG. 6, there may be a space between the second spacer 209b and the first substrate 201, and the space can be adjusted according to the design need.

The invention also provides a method for manufacturing the liquid crystal cell of the first embodiment described above. Referring to FIG. 6, the method includes: firstly, providing a first substrate 201 which has first region X and second region Y; forming a gate electrode 203 having the shape shown in FIG. 6 on the surface of the first substrate 201 by a photo-mask process; forming a passivation layer 204 on the whole surface of the gate electrode; and forming a first overcoat layer 207 on the surface of the passivation layer 204. In addition, the method further includes: providing a second substrate 202 bonded with the first substrate 201; forming a first spacer 209a on a surface of the second substrate 202 that is close to the first substrate 201 and is in the first region X; and forming a second spacer 209b on a surface of the second substrate 202 that is close to the first substrate 201 and is in the second region Y, where the length of the first spacer 209a is greater than the length of the second spacer 209b, and herein the length of the first spacer 209a may also be equal to the length of the second spacer 209b, or the two lengths may be interchanged. Furthermore, the method further includes: forming a barrier layer 210 on the surface of the first overcoat layer 207 located on the first substrate 201 at a position corresponding to the first spacer 209a by a photo-mask process, with the area of a lower surface of the barrier layer 210 being greater than the area of a lower surface of the first spacer 209a; and finally bonding the first substrate 201 with the second substrate 202 and injecting liquid crystal 211 therebetween.

Second Embodiment

Figure 7:
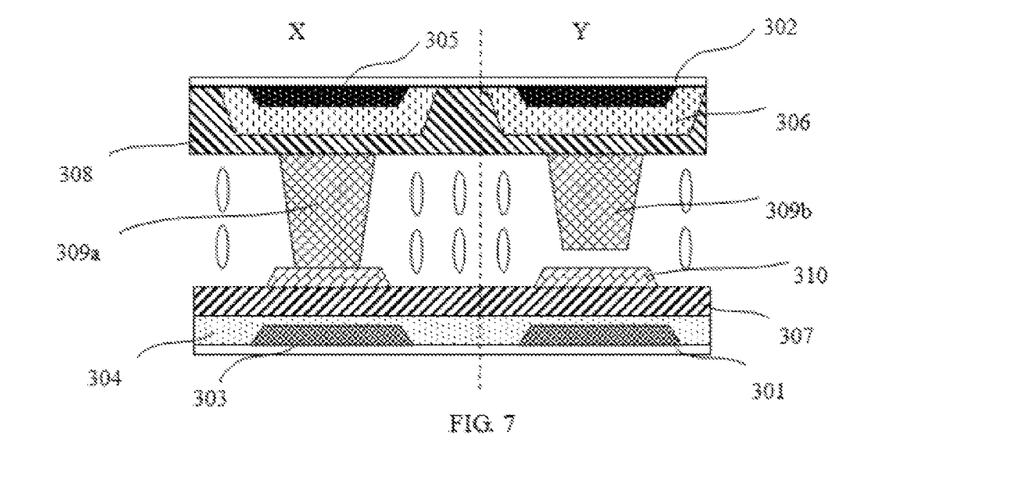
FIG. 7 is a cross-sectional view of a liquid crystal cell according to a second embodiment of the invention.

FIG. 7 is a sectional view of a liquid crystal cell according to a second embodiment of the invention. As shown in FIG. 7, the liquid crystal cell includes a first substrate 301 and a gate electrode 303 formed on the first substrate 301 and having the shape shown in FIG. 7, and a passivation layer 304 and a first overcoat layer 307 are sequentially formed on the surface of the gate electrode 303. In addition, the liquid crystal cell further includes a second substrate 302 bonded with the first substrate 301, with a black matrix layer 305 and a color filter layer 306 having the shapes shown in FIG. 7 being sequentially formed on the surface of the second substrate 302, and a second overcoat layer 308 being formed on the surface of the color filter layer 306. As shown in FIG. 7, the liquid crystal cell is divided into a first region X and a second region Y along a vertical axis. A first spacer 309a is formed on the surface of the second substrate 302 in the first region X and a second spacer 309b is formed on the surface of the second substrate 302 in the second region Y. The first spacer 309a and the second spacer 309b abut against the first substrate 301 and the second substrate 302 respectively at their respective upper ends and lower ends, so as to maintain a space between the first substrate 301 and the second substrate 302. The length of the first spacer 309a is greater than the length of the second spacer 309b, the area of a lower surface of the first spacer 309a is less than the area of an upper surface of the first spacer 309a and the area of a lower surface of the second spacer 309b is less than the area of an upper surface of the second spacer 309b, and a liquid crystal layer 311 is formed between the first substrate 301 and the second substrate 302.

The material of the first substrate 301 and the second substrate 302 may be selected as a material such as glass or resin. The gate electrode 303 located on the surface of the first substrate 301 is made of a metal material. The passivation layer 304 is made of a material of silicon nitride, for playing a role of insulation and protection for the gate electrode. The first overcoat layer 307 located on the surface of the passivation layer 304 is made of a transparent organic material, for playing a role of planarization. In addition, the black matrix layer 305 located on the surface of the second substrate 302 plays a role of light-shielding. The color filter layer 306 located on the surface of the black matrix layer 305 is made of an organic material, so as to obtain red, blue or green light by filtering the incoming white light. The second overcoat layer 308 is also made of a transparent organic material, for playing a role of planarization. The first spacer 309a and the second spacer 309b substantially have the same hardness and can be made of the same material, and the material is generally an organic material, for playing a role of maintaining a space between the first substrate and the second substrate and preventing them from damage.

Both the first overcoat layer 307 and the second overcoat layer 308 are made of an organic material, and substantially have the same the hardness. In the prior art, when a greater external force is applied to the second substrate, since the area of a lower surface of the first spacer is less than an upper surface of the first spacer and the area of a lower surface of the second spacer is less than the area of an upper surface of the second surface, the first overcoat layer 307 suffers a great intensity of pressure, thus it is easy to be damaged. Therefore, in order to avoid the above case that the damaged first overcoat layer can not recover, in the second embodiment, a barrier layer 310 is formed on the surface of the first overcoat layer in both the first region X and the second region Y, and the area of a lower surface of the barrier layer 310 in the first region X is greater than the area of the lower surface of the first spacer 309a, and the area of a lower surface of the barrier layer 310 in the second region Y is greater than the area of the lower surface of the second spacer 309b.

Figure 8:
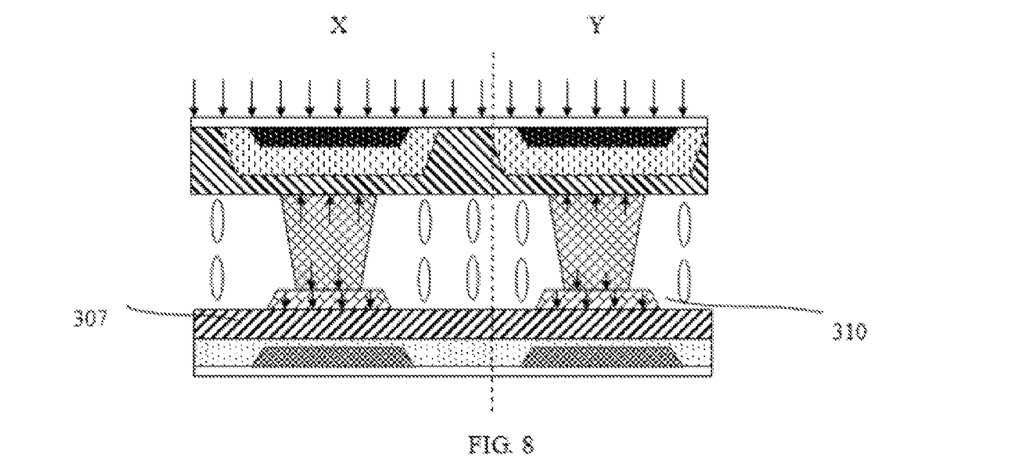
FIG. 8 is a schematic diagram of the liquid crystal cell shown in FIG. 7 in the case of suffering a greater external pressure.

As shown in FIG. 8, when suffering an external force (such as 990 N), the pressure suffered by the first overcoat layer 307 is from the barrier layer 310, and since the area of the lower surface of the barrier 310 is greater than the area of the lower surface of the first spacer and the area of the lower surface of the second spacer, the intensity of pressure suffered by the first overcoat layer 307 is reduced significantly, thus damage of the first overcoat layer 307 is avoided; and since the area of the upper surface of the first spacer is greater than the area of the lower surface of the first spacer and the area of the upper surface of the second spacer is greater than the area of the lower surface of the second spacer, the intensity of pressure suffered by the second overcoat layer located on the surface of the second substrate is reduced, thus damage is less likely to occur. In the second embodiment, the material of the barrier layer 310 is selected as Indium Tin Oxide (ITO), and also it may be selected as other metal materials or nonmetallic materials, and in order not to influence the aperture ratio, preferably, it may be selected as a transparent metal oxide material and so on. In addition, with regard to the hardness of materials, the metal material of the gate electrode has the greatest hardness, the hardness of the material of the passivation layer is less than the hardness of the gate electrode, and the hardness of material of the first spacer and the second spacer is less than the hardness of the gate electrode.

The structure in the second embodiment can satisfy the need for the display device with high Pixels Per Inch (PPI) in the market. The technology of Low Temperature Poly-Silicon (LTPS) is applied in the structure, a first overcoat layer is formed on the surface of the first substrate, and employing the structure described above can significantly prevent the first overcoat layer from damage.

The invention also provides a method for manufacturing the liquid crystal cell of the second embodiment described above. Referring to FIG. 7, the method includes: providing a first substrate 301; forming a gate electrode 303 having the shape shown in FIG. 7 on the surface of the first substrate 301 by a photo-mask process; forming a passivation layer 304 on the whole surface of the gate electrode, and forming a first overcoat layer 307 on the surface of the passivation layer 304. In addition, the method further includes: providing a second substrate 302 bonded with the first substrate 301; forming a black matrix layer 305 and a color filter layer 306 having the shapes shown in FIG. 7 on a lower surface of the second substrate 302 by two photo-mask processes; forming a second overcoat layer 308 on the whole surface of the color filter layer. Furthermore, the method further includes: on the surface of the second overcoat layer, forming a first spacer 309a in the first region X and a second spacer 309b on the surface of the second region Y, where the length of the first spacer 309a is greater than the length of the second spacer 309b, and the area of a lower surface of the first spacer 309a is less than the area of an upper surface of the first spacer 309a and the area of a lower surface of the second spacer 309b is less than the area of an upper surface of the second spacer 309b. In addition, the method further includes: forming a barrier layer 310 on the surface of the first overcoat layer 307 located on the first substrate 301 at positions respectively corresponding to the first spacer 309a and the second spacer 309b by the photo-mask process, the area of a lower surface of the barrier layer 310 being greater than the area of the lower surface of the first spacer 309a; and bonding the first substrate 301 with the second substrate 302 and injecting liquid crystal 311 therebetween.

Third Embodiment

Figure 9:
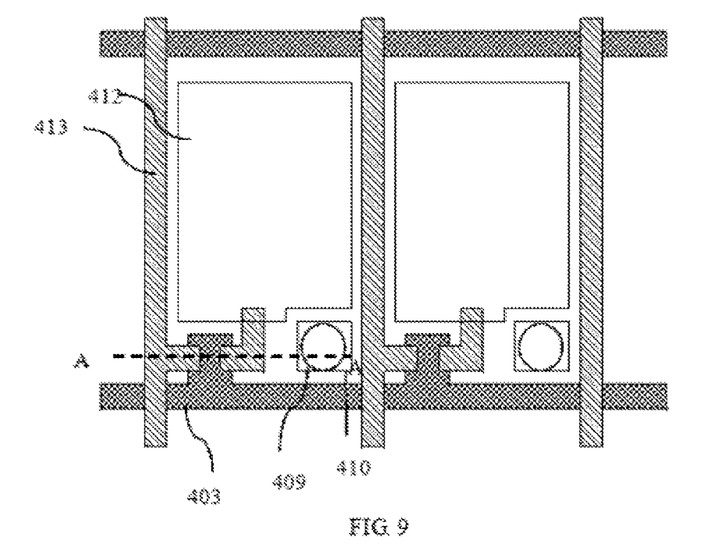
FIG. 9 is a plan view of a liquid crystal display device according to the invention.
Figure 10:
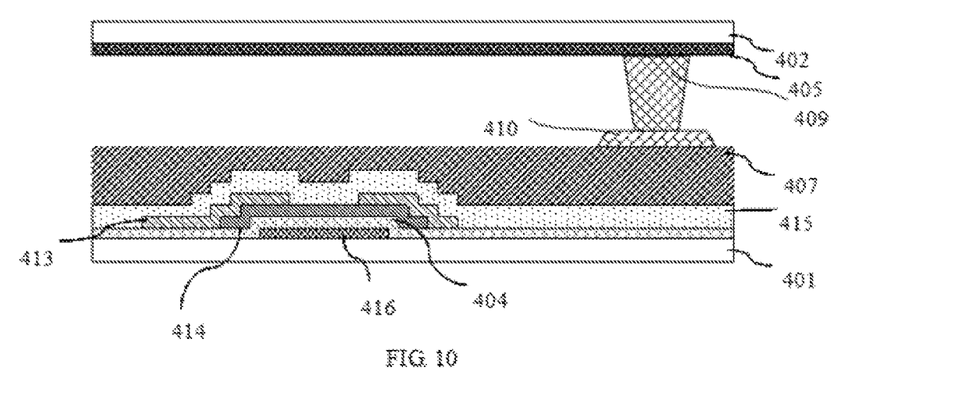
FIG. 10 is a sectional view of the liquid crystal display device shown in FIG. 9 along the A-A line.

FIG. 9 is a plan view of a liquid crystal display device according to the present invention, and FIG. 10 is a sectional view of the liquid crystal display device in FIG. 9 according to the invention along the A-A line of FIG. 9. In FIG. 10, the liquid crystal display device may include a first substrate 401 and a second substrate 402, where the first substrate 401 and the second substrate 402 are bonded together with a predetermined space being formed therebetween; and a liquid crystal layer (not shown in the Figure), the liquid crystal layer being formed by injecting the liquid crystal material between the first substrate 401 and the second substrate 402 bonded together.

In FIG. 9, the first substrate may include: multiple scanning lines 403 and data lines 413; a pixel electrode 412; and multiple Thin Film Transistors (TFT), in which the scanning lines 403 and the data lines 413 may intersect with each other, to define multiple pixel regions. In addition, the pixel electrode 412 is formed in the pixel region, and the TFT may be formed at the cross section between the scanning line 403 and the data line 413.

FIG. 10 is a sectional view of the liquid crystal display device along the A-A line. The liquid crystal display device includes: a first substrate 401; a gate electrode 416 with the shape shown in FIG. 10 that is formed on the first substrate 401 by a photo-mask process; a passivation layer 404 coated on the surface of the gate electrode 416; an active layer 414 formed on the surface of the passivation layer 404 by a photo-mask process; a source electrode and a drain electrode 413 formed on the surface of the active layer by a photo-mask process; an insulation layer 415 coated on the surface of the source electrode and the drain electrode 413; and an overcoat layer 407 coated on the surface of the insulation layer. In addition, the liquid crystal display device further includes a second substrate 402 (a light filter film structure), a black matrix layer 405 formed on a lower surface of the second substrate 402, and a spacer 409 formed on a lower surface of the black matrix layer at a position far away from the TFT. Furthermore, the liquid crystal display device includes a barrier layer 410 formed on the surface of the overcoat layer 407 above the first substrate 401 at a position corresponding to the lower end of the spacer.

The overcoat layer is made of an organic material, the hardness of the overcoat layer is much less than the hardness of the black matrix layer, and the area of the lower surface of the barrier layer is greater than the area of the lower surface of the spacer. When suffering an external pressure, the pressure suffered by the overcoat layer is from the barrier layer, and since the area of the lower surface of the barrier layer is greater than the area of the lower surface of the spacer, the intensity of pressure suffered by the overcoat layer is reduced significantly, thus damage of the overcoat layer is avoided; and since the hardness of the black matrix layer is greater than the hardness of the overcoat layer, and the area of the upper surface of the spacer in contact with the black matrix layer is greater than the area of the lower surface of the spacer, the intensity pressure suffered by the black matrix layer is small, thus a damage is not inclined to occur. Specifically, the material of the barrier layer is selected as Indium Tin Oxide (ITO), and also it may be selected as other metal materials or non-metallic materials; and in order not to influence the aperture ratio, it may be selected as a transparent metal oxide material and so on.

In addition, the material of the first substrate 401 and the second substrate 402 may be selected as a material such as glass or resin. The second substrate 402 is a light filter film. The gate electrode 416, the source electrode and the drain electrode 413 located on the surface of the first substrate 401 are made of a metal material, such as Mo, Al or Cr. The passivation layer 304 and the insulation layer 415 are made of a material of nitride silicon or silicon oxide, for playing a role of insulation and protection for the gate electrode and the active layer. The overcoat layer 407 located on the surface of the insulation layer 415 is made of a transparent organic material, for playing a role of planarization. In addition, the black matrix layer 405 located on the surface of the second substrate 402 plays a role of light-shielding, i.e., preventing light from emitting from portions corresponding to the gating lines, the data lines and the TFTs (except the pixel regions). The material of the spacer 409 is generally an organic material, for maintaining a space between the first substrate and the second substrate and preventing them from damage.

In order to indicate the direction of the force more clearly, an arrow is shown in the accompanying drawings of the specification. The direction of the arrow represents the direction of the pressure, and the length of the arrow loosely corresponds with a relative magnitude of the pressure.

Those skilled in the art can make various variations and modifications to the disclosed embodiments without departing from the spirit and scope of the invention. As long as these variations and modifications fall within the scope of claims of the invention and equivalent technologies thereof, the invention is intended to include these variations and modifications.

What is claimed is:

1. A liquid crystal cell, comprising:
a first substrate;
a first overcoat layer being formed on a surface of the first substrate, wherein the first substrate comprises a first region and a second region;
a barrier layer being formed on a surface of the first overcoat layer in the first region;
a second substrate bonded with the first substrate;
a first spacer being formed on a surface of the second substrate facing the first substrate, wherein the first spacer is aligned with the first region;
a second spacer being formed on the surface of the second substrate facing the first substrate, wherein the second spacer is aligned with the second region, wherein the length of the first spacer is greater than or equal to the length of the second spacer; and
a liquid crystal layer formed between the first substrate and the second substrate,
wherein the surface area of a lower surface of the barrier layer is greater than the surface area of a lower surface of the first spacer; and
wherein the material of the barrier layer is a transparent metal or an oxide of the transparent metal.

2. The liquid crystal cell according to claim 1, wherein a second overcoat layer is formed on the surface of the second substrate, and the hardness of the second overcoat layer is substantially the same as the hardness of the first overcoat layer.

3. The liquid crystal cell according to claim 2, wherein the material of each of the first overcoat layer and the second overcoat layer is an organic material.

4. The liquid crystal cell according to claim 3, wherein the first overcoat layer and the second overcoat layer are made of the same material.

5. The liquid crystal cell according to claim 1, wherein the surface area of the lower surface of the first spacer is less than the surface area of an upper surface of the first spacer and the surface area of a lower surface of the second spacer is less than the surface area of an upper surface of the second spacer.

6. The liquid crystal cell according to claim 5, wherein a barrier layer is formed on the surface of the first overcoat layer in the second region.

7. The liquid crystal cell according to claim 6, wherein the surface area of a lower surface of the barrier layer on the first overcoat layer in the second region is greater than the surface area of the lower surface of the second spacer.

8. The liquid crystal cell according to claim 2, wherein a gate and a passivation layer formed on the gate are further formed between the first substrate and the first overcoat layer; and a black matrix layer and a color filter layer formed on the black matrix layer are formed between the second substrate and the second overcoat layer.

9. A display device, including a liquid crystal cell which comprise:
- a first substrate;
- a first overcoat layer being formed on a surface of the first substrate, wherein the first substrate comprises a first region and a second region;
- a barrier layer being formed on a surface of the first overcoat layer in the first region;
- a second substrate bonded with the first substrate;
- a first spacer being formed on a surface of the second substrate facing the first substrate, wherein the first spacer is aligned with the first region;
- a second spacer being formed on the surface of the second substrate facing the first substrate, wherein the second spacer is aligned with the second region, wherein the length of the first spacer is greater than or equal to the length of the second spacer; and
- a liquid crystal layer formed between the first substrate and the second substrate,
- wherein the surface area of a lower surface of the barrier layer is greater than the surface area of a lower surface of the first spacer; and
- wherein the material of the barrier layer is a transparent metal or an oxide of the transparent metal.

10. The display device according to claim 9, wherein the surface area of the lower surface of the first spacer is less than the surface area of an upper surface of the first spacer and the surface area of a lower surface of the second spacer is less than the surface area of an upper surface of the second spacer.

11. The liquid crystal cell according to claim 10, wherein a barrier layer is formed on the surface of the first overcoat layer in the second region.

12. The liquid crystal cell according to claim 11, wherein the surface area of a lower surface of the barrier layer on the first overcoat layer in the second region is greater than the surface area of the lower surface of the second spacer.

* * * * *